United States Patent [19]
Willey

[11] Patent Number: 5,784,411
[45] Date of Patent: Jul. 21, 1998

[54] METHOD AND SYSTEM FOR PROCESSING SIGNALS FOR USE IN A WIRELESS COMMUNICATION SYSTEM

[75] Inventor: William Daniel Willey, Arlington Heights, Ill.

[73] Assignee: Motorola, Inc., Schaumburg, Ill.

[21] Appl. No.: 651,364

[22] Filed: May 22, 1996

[51] Int. Cl.$^6$ ...................................................... H04L 7/00
[52] U.S. Cl. ...................... 375/368; 375/369; 370/104.1
[58] Field of Search ...................................... 375/368, 369, 375/347; 370/104.1, 75

[56] References Cited

U.S. PATENT DOCUMENTS

| | | |
|---|---|---|
| 4,368,722 | 1/1983 | Little et al. |
| 4,498,187 | 2/1985 | Soderberg et al. ............... 375/117 |
| 4,517,683 | 5/1985 | Caspari ............................ 375/117 |
| 4,560,939 | 12/1985 | DeKarke et al. ................ 328/72 |
| 4,589,120 | 5/1986 | Mendala ........................... 375/117 |
| 4,606,056 | 8/1986 | Perloff ............................. 375/110 |
| 4,689,787 | 8/1987 | Hotta ................................ 370/104 |
| 4,984,290 | 1/1991 | Levine et al. |
| 5,033,062 | 7/1991 | Morrow et al. ................ 375/7 |
| 5,072,445 | 12/1991 | Nawata ............................ 370/104.1 |
| 5,146,610 | 9/1992 | Longshore et al. |
| 5,222,081 | 6/1993 | Lewis et al. .................... 375/117 |
| 5,406,559 | 4/1995 | Edem et al. ..................... 370/91 |
| 5,559,833 | 9/1996 | Hayet .............................. 375/259 |
| 5,654,867 | 8/1997 | Labedz et al. |

Primary Examiner—Stephen Chin
Assistant Examiner—Mohammad Ghayour

[57] ABSTRACT

A method of processing a received signal in a wireless communication system (20), the method comprising the steps of detecting a first digital signal at a first receiver (26), measuring timing parameters of the first digital signal, and sending data associated with the timing parameters to a second receiver (28).

17 Claims, 4 Drawing Sheets

METHOD AND SYSTEM FOR PROCESSING SIGNALS FOR USE IN A WIRELESS COMMUNICATION SYSTEM

FIELD OF THE INVENTION

This invention relates generally to wireless communication systems, and more particularly to a method and system for processing signals for use in a wireless communication system.

BACKGROUND OF THE INVENTION

Traditional wireless communication systems incudes base stations that each include voice transceivers and at least one scan receiver. The scan receiver may be used to take a quality measurement of a signal transmitted by a subscriber unit in an adjacent cell that is a candidate for a hand-off. Such quality measurements are typically taken for many candidate cells by a scan receiver in each of the candidate cells. The cell with the best quality measurement is typically selected for hand-off. However, often the scan receiver may be measuring a signal other than the signal transmitted by the subscriber unit. In such a situation, the scan receiver may produce a high signal quality measurement that is incorrect since it is not based on the signal from the subscriber unit.

To reduce the probability of such incorrect measurements in certain cellular systems the scan receivers measure a periodically transmitted identifying signal from the subscriber unit, such as a digital supervisory audio tone (DSAT) used in narrowband analog scan systems. In these cellular systems, the scan receiver detects DSAT before indicating that the signal quality measurement should be relied upon. However, the DSAT signal is not always transmitted by the subscriber unit, such as during the transmission of synchronization and data words. Thus, if the DSAT detection occurs when DSAT is not transmitted, the associated signal quality measurement may be improperly disqualified.

It would therefore be desirable if a method were devised for determining whether a signal quality measurement is based on a particular subscriber unit's transmission without using conventional DSAT detection. Accordingly, there is a need for an improved method for processing signals for use in a wireless communication system.

SUMMARY OF THE INVENTION

In order to address this need, the present invention provides a method of processing a received signal in a wireless communication system. The method includes the steps of detecting a first digital signal at a first receiver measuring timing parameters of the first digital signal, and sending data associated with the timing parameters to a second receiver.

According to another aspect of the invention, a method of performing hand-off from a first communication channel to a second communication channel in a wireless communication system is provided. The method includes the steps of detecting a first digital signal at a first receiver, measuring timing parameters of the first digital signal sending a first message to a central processor responsive to the first and second communication channels, sending a second message from the central processor to the second receiver, detecting a second digital signal at the second receiver beginning at a start time while continuing to detect the first digital signal at the first receiver, sending a third message from the second receiver to the central processor, and comparing the second digital signal to at least a portion of the first digital signal based on the start time. The first message includes data associated with the timing parameters. The second message is based on information contained in the first message. The third message includes the second digital signal and the start time.

According to another aspect of the invention, a method of processing signals for use with a wireless communication system is provided. This method includes the steps of detecting a first digital signal at a first receiver, sampling a second signal at a second receiver over a first time interval from a first start time to a first end time to produce a first portion of a second digital signal, sampling a second signal at the second receiver over a second time interval from a second start time to a second end time to produce a second portion of the second digital signal, and comparing the first and second portions of the second digital signal to a portion of the first digital signal based on the first and second start times and based on the first and second end times. The first digital signal is representative of information transmitted by a subscriber unit.

According to another aspect of the invention, a wireless communication system is provided. The system includes a first antenna receiving a first analog signal, a second antenna receiving a second analog signal, a first receiver responsive to the first antenna, a second receiver responsive to the second antenna and time synchronized with the first receiver, a measurement unit responsive to the first receiver, and a data communication link responsive to the first receiver. The first receiver detects a first digital signal derived from the first analog signal. The second receiver detects a second digital signal derived from the second analog signal. The measurement unit measures timing parameters of the first digital signal and the data communication link carries data associated with the timing parameters.

The invention itself, together with its intended advantages may best be understood by reference to the following detailed description, taken in conjunction with the accompanying drawings.

DETAILED DESCRIPTION OF THE PREFERRED EMBODIMENTS

Figure 1:
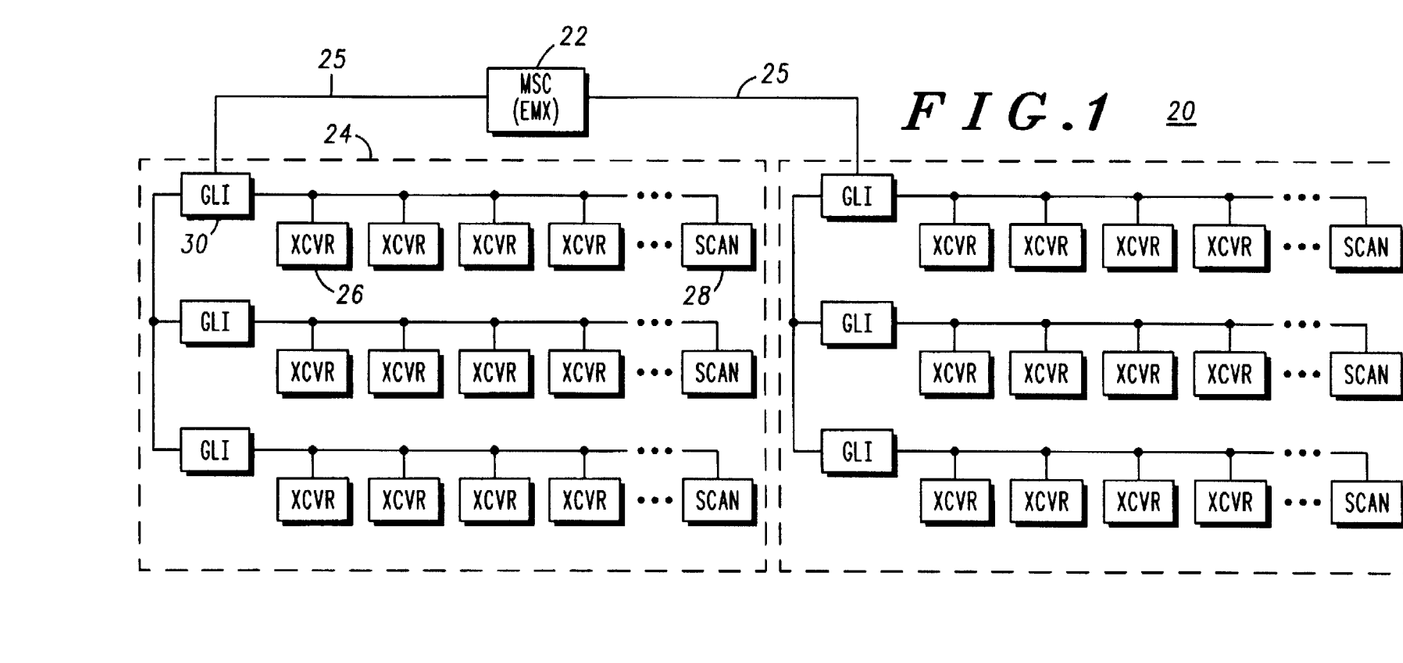
FIG. 1 is a block diagram of a preferred embodiment of a wireless communication system.

Referring to FIG. 1, a wireless cellular communication system 20 is illustrated. The cellular communication system 20 includes a mobile switching center (MSC) 22 and a plurality of base transceiver stations (BTS) 24 connected to the mobile switching center 22 via span lines 25. Each of the base transceivers stations 24 include a plurality of transceivers (XCVR) 26, scan receivers (SCAN) 28 and interface circuits (GLI) 30. In the particular embodiment of FIG. 1, the mobile switching center 22 is a switch, such as a Motorola EMX2500™. The base transceiver stations 24 may be a suitable base station such as a Motorola SC 9600™ base station.

Figure 2:
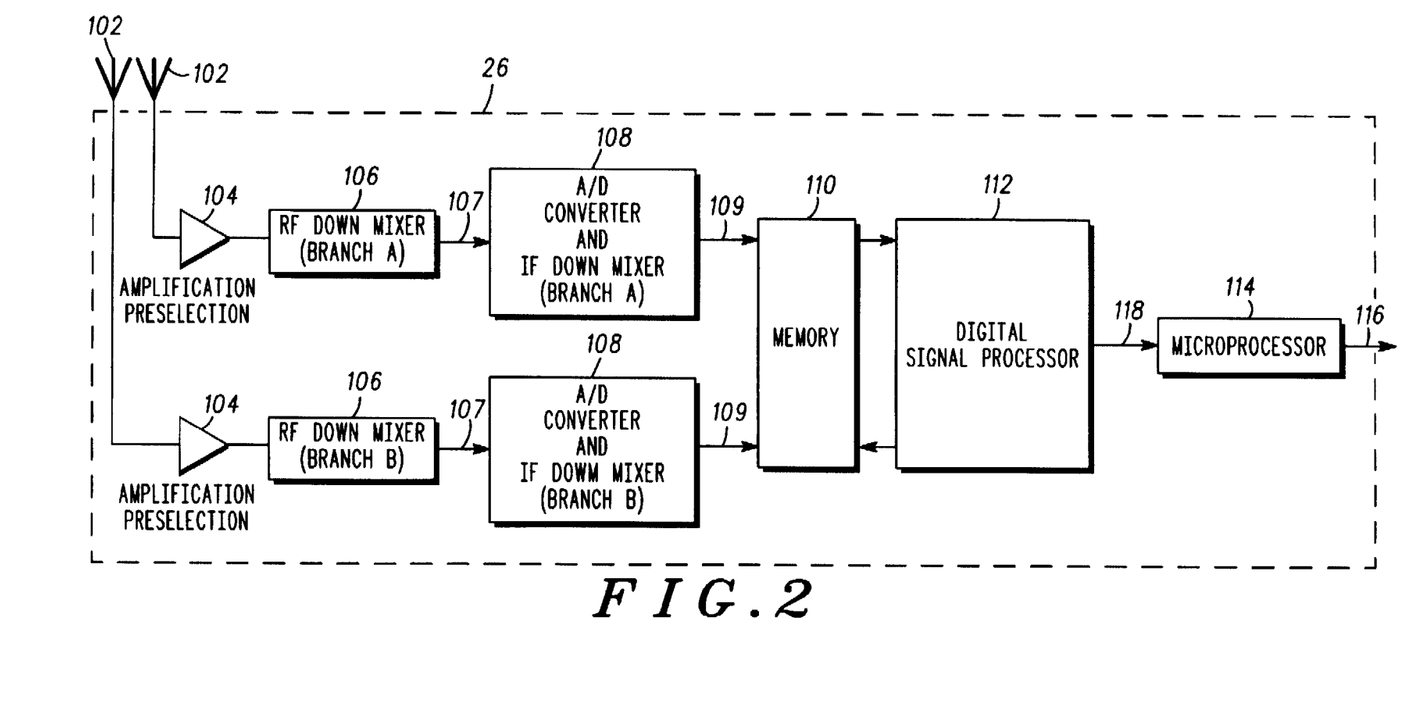
FIG. 2 is a block diagram of the transceiver of FIG. 1.

Referring to FIG. 2, a more detailed diagram of the transceiver 26 is shown. The transceiver 26 is connected to a plurality of antennas 102, and includes a plurality of amplification and preselection circuits 104, and a plurality of downmixers 106 and 108. The amplifiers 104 and downmixers 106 and 108 comprise a conventional RF stage. The transceiver 26 also includes a controller such as first processor 112, postprocessor 114, and memory 110. The first processor 112 is coupled to the memory 110 and the postprocessor 114. The postprocessor 114 receives signals 118 from the first processor 112 and outputs a processed signal 116 which is linked to GLI 30.

In the transceiver 26, a radio frequency (RF) signal is received at the antenna 102 and is amplified by amplifier 104, and down converted by the downmixer 106 to produce intermediate frequency (IF) signal 107. The downmixer 108 receives the IF signal 107 and provides a digital signal, such as a complex baseband signal sent over a data bus 109, such as a direct memory access bus carrying in phase (I) and quadrature (Q) components as well as automatic gain control (AGC) values associated with the baseband signal. The I, Q and AGC values are then stored in the memory 110. It should be pointed out that both SCAN receivers 28 and XCVRs 26 typically contain the same hardware as shown in FIG. 2.

Figure 3:
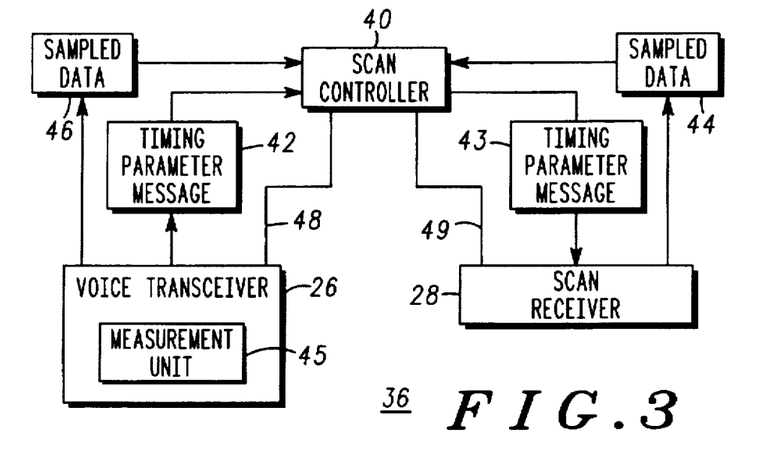
FIG. 3 is a block diagram of a portion of the wireless communication system of FIG. 1.

Referring to FIG. 3, a logical view of a preferred embodiment of a system 36, which may be a portion of the wireless communication system 20, is illustrated. The system 36 includes a first receiver 26, such as a voice transceiver, a scan controller 40, and a second receiver 28, such as a scan receiver. The first receiver 26 is in communication with the scan controller 40 via data communication link 48 which is in communication with the second receiver 28 via data communication link 49.

In addition, the first receiver 26 is time synchronized with the second receiver 28, such as by providing a common clock to each receiver 26, 28. Since each MSC 22 is equipped with an accurate clock, such as a GPS receiver, one method of providing a common clock is to send timing information to BTSs 24 via a timeslot of T1 spans 25. The GLIs 30 that terminate the T1 spans 25 distribute the timing information via a data bus to other GLIs in the BTSs 24. The timing information may be distributed to the XCVRs 26 and SCANs 28 which are connected to the GLIs 30 via data busses. In an alternate configuration, each BTS 24 may be equipped with a GPS receiver or some other accurate clock. The timing information from the BTS 24 clock may be distributed to the XCVRs 26 and SCANs 28 in each BTS 24 via data busses.

The data communication links 48, 49 may be any suitable communication media such as a T1 communication link or a parallel data bus depending on the particular configuration. The first receiver 26 is electrically coupled to or in communication with a measurement unit 45 that is capable of performing timing measurements of a detected signal received by the transceiver 26, such as a digital signal carrying information transmitted by a subscriber unit, such as a cellular telephone. The scan controller 40 may be a process executing on a microprocessor, such as microprocessor 112 or 114 located at transceiver 26, or scan receiver 28 in a BTS 24, or at a processor in the MSC 22. In the case where the scan controller 40 is located at the MSC 22, the data links 48, 49 may be the span lines 25 connecting a BTS 24 to the MSC 22.

During operation, after the voice transceiver 26 has locked onto a first received digital signal, such as a mobile unit subaudible signal in a narrowband analog cellular application, the voice transceiver 26 activates the measurement unit 45 to perform timing measurements. These timing measurements include an estimate of the transmit bit rate, the beginning time of the last received bit, a subaudible bit in the case of a narrowband analog signal, and the bit number of the last received bit. To determine the bit number, the measurement unit 45 includes a counter that is first initialized and then incremented when each successive bit from the received digital signal is successfully detected. Each individually detected bit may be conveniently referenced by a particular value from the counter.

A particular method of detecting a DSAT signal within a voice transceiver 26 is described below. DSAT and DST within a voice transceiver are preferably detected by processor 112. Processor 112 implements a phase lock loop (PLL) in order to lock to a received sub-audible signal and to recover individual bit values of the sub-audible signal. The received bits from the PLL are entered into a 24 bit register. The 24 bit DSAT sequence assigned to the voice transceiver 26 is compared to the received bits and if there are 1 or no errors, then an "initial DSAT detect" condition has occurred. If more than 1 error has occurred, then the DSAT sequence is rotated and again compared to the received 24 bit register. This is repeated until either an initial detect occurs or all 24 cyclic rotations of the DSAT sequence have been compared. If the latter case is true, then the next received bit is shifted into the 24 bit receive register. If an initial detect has occurred, then the current DSAT phase has been determined and an acquisition routine starts comparing only the expected DSAT phase. Note that the above described technique may also be used to detect a DST if the received sequence is compared to the inverted DSAT sequence.

After an "initial DSAT detect" condition has occurred, the bits in the above described 24 bit register will be copied into a 30 bit register known as the B window. Subsequent received bits will be shifted into the B window. As new bits are shifted into the least significant bit position of the B window, older bits from the most significant bit position of the B window will be shifted into the least significant bit position of a window known as the A window. Similarly, after an "initial DSAT detect" has occurred, the values of the DSAT sequence with which a match was found will be copied into a 30 bit register known as the D window. As new bits are received, the least significant bit position of the D window may be updated with the next expected DSAT bit. As the least significant bit of the D window is updated with subsequent bits in the DSAT sequence, bits from the most significant bit position of the D window may be shifted into the least significant bit position of a window known as the C window. As bits are received by the voice transceiver 26, the status of DSAT and DST may be determined by making comparisons of the bits in the B and D windows and by making comparisons of the bits in the A and C windows.

After an "initial DSAT detect" condition has occurred, the next 6 received bits are shifted into the B window and then compared to the expected DSAT bits, utilizing the determined DSAT phase. If all 6 bits of this check are correct, then a "confirmed DSAT detect" has occurred. If an error occurs, then the next bit is shifted into the B window and DSAT acquisition starts over looking for an "initial DSAT detect." Note that the above described technique may also be used to detect a DST if the received sequence is compared to the inverted DSAT sequence.

After a "confirmed DSAT detect" condition has occurred, the voice transceiver 26 then transitions to the "DSAT detect" state and begin monitoring the status of DSAT and DST via comparisons of the B and D windows and A and C windows as subsequent bits are received. Note that a state of "DST detect" could be entered if the received sequence was compared to the inverted DSAT sequence. A state of "no detect" may be entered from either the "DSAT detect" or "DST detect" states if a comparison of the B and D windows yields a number of bit errors that is greater than three but less than 27 and a comparison of the A and C windows yields a number of bit errors that is greater than three but less than 27. After entering a state of "no detect" the state of "DSAT detect" may be entered if a comparison of the B and D windows yields a number of bit errors that is less than or equal to 2. Similarly, after entering a state of "no detect" the state of "DST detect" may be entered if a comparison of the B and D windows yields a number of bit errors that is greater than or equal to 28. The voice transceiver may transition from the state "DSAT detect" to the state "DST detect" if a comparison of the B and D windows yields a number of bit errors that is greater than 26 or if a comparison of the A and C windows yields a number of bit errors that is greater than 26 when a comparison of the B and D windows yields a number of bit errors that is greater than three but less than 27. Similarly, the voice transceiver may transition from the state "DST detect" to the state "DSAT detect" if a comparison of the B and D windows yields a number of bit errors that is less than 4 or if a comparison of the A and C windows yields a number of bit errors that is less than 4 when a comparison of the B and D windows yields a number of bit errors that is greater than three but less than 27.

Note that from any of the states "no detect," "DSAT detect," or "DST detect," the voice transceiver 26 may temporarily enter a state in which it receives a message when a comparison of the B window with the 30 bit synchronization word yields a number of bit errors that is less than or equal to 4. It should be understood that the present invention is not limited to a particular method of detecting a DSAT or DST signal and that the above described method is disclosed only as a particular example for illustrative purposes.

Again referring to FIG. 3, a first message 42, referred to as a timing parameter message, is formed and then sent from the first receiver 26 to the scan controller 40. The timing parameter message 42 includes timing parameters based on the first received digital signal, such as the timing measurement data discussed above with reference to the measurement unit 45. The scan controller 40 detects the first message 42 and sends a second message 43 based on the first message. The second message 43 also includes timing parameter information. In a particular illustrative example, the second message 43 includes a bit number measured by the voice transceiver 26, the beginning time that the bit number was detected, the transmit rate of the first digital received signal, and a number of bits to be sampled by the second receiver 28.

After the scan receiver 28 has detected the second message 43 and after the scan receiver is idle, the scan receiver 28 tunes to the frequency of the first received signal so that the scan receiver 28 can detect a second digital signal that corresponds to the first digital signal. The scan receiver 28 begins sampling the second digital signal, typically a sub-audible signal such as a DSAT signal transmitted by the subscriber unit, at the beginning of the next full bit to be detected. The second receiver 28 then samples the number of bits requested by the scan controller 40. When sampling is completed, the scan receiver 28 returns sampled data 44, such as the sampled bits along with the bit number of the first sampled bit, to the scan controller 40. In addition, the sampled data 44 may also include a signal quality measurement such as a signal strength measurement of the second received signal performed by the scan receiver 28. Alternatively, the signal quality measurement could be sent in a separate message to the scan controller 40.

Meanwhile, the voice transceiver 26 continues detection of the first digital signal. The voice transceiver 26 sends sampled data 46, including detected bits of the first received digital signal and the bit counter value for each detected bit, to the scan controller 40. The sampled data 46 may be sent to the scan controller 40 after each individual received bit is detected or the sampled data may be sent in a longer message that includes a plurality of detected bits. In addition, it should be noted that the sampled data 46 has preferably been error corrected by the voice transceiver 26 before being sent to the scan controller 40.

Voice transceiver 26 receives a sub-audible signal and performs error correction on the signal. Voice transceiver 26 compares the sub-audible signal to an expected replica of DSAT and, if the sub-audible signal is substantially similar, corrects any bits that were in error by changing the values to the values of the expected replica. Similarly, Voice transceiver 26 compares the sub-audible signal to an expected replica of DST and, if the sub-audible signal is substantially similar, corrects any bits that were in error or by changing the values to the values of the expected replica. DSAT to DST transitions and DST to DSAT transitions may be accurately determined as described in U.S. Pat. No. 5,146,610. Voice transceiver 26 compares the received sub-audible signal to a known synchronization word and if the sub-audible signal is substantially similar corrects any bits that were in error by changing the values to the values of the known synchronization word.

After receiving the subscriber unit message, the voice transceiver 26 attempts to decode the message, such as by using bch decoding techniques as commonly known in the art. If decoding is successful, a data word, such as a manchester word, may be reconstructed and forwarded to the scan controller 40. If decoding is unsuccessful, the voice transceiver 26 will not forward the sampled data to the scan controller 40. However, if the message from the subscriber unit is later repeated and successfully decoded and it can be determined that a previously undecodable data word was later decoded, the voice transceiver 26 may forward the corrected values of the decoded message to the scan controller 40, indicating the bit positions of the previously undecodable data word.

In a particular illustrative example in a narrowband cellular application, the first digital signal received by the transceiver 26 may be either a DSAT signal or a DST signal. A DST signal instead of a DSAT signal is typically transmitted by a mobile subscriber with a specific type of phone, referred to as a DTX phone (when the phone is muted and transmitting at low power). However, the first digital signal may also include a synchronization word. In this case, the voice transceiver 26 transitions to a state to detect a message transmitted by the subscriber unit. While the subscriber unit message is being detected, the voice transceiver 26 typically does not forward sampled data 46 to the scan controller 40. In addition, when the voice transceiver 26 determines that it can not detect either a DSAT condition or a DST condition since there are too many errors, the voice transceiver 26 may choose not to forward sampled data 46 to the scan controller at that time. Further, the voice transceiver 26 may include a buffering mechanism, such as using one or more re-ions of memory as a logical window of data, preferably two windows with each window having 30 bits, to temporarily store bits of the detected signal prior to transmission to the scan controller 40. Note that the buffer may be any suitable size depending on the size of the received message.

The scan receiver 28 may then calculate the number of bits that have been transmitted since the beginning of the bit number received in the timing parameter message 43, e.g. transmitted bits=(current time−bit transmit time) * transmit rate. The scan receiver 28 also calculates the number of bits remaining and the time remaining until the beginning of the next full bit. The scan receiver 28 may also calculate the bit number of the first sampled bit. Based on this information, the scan receiver 28 may include a bit number and sampled bits in the sampled data message 44 so that the scan controller 40 may compare the bits received from the scan receiver 28 to corresponding bits received from the voice transceiver 26 over the same time interval to determine whether the first digital signal detected at the voice transceiver 26 matches the second digital signal detected at the scan receiver 28.

In one method of bit comparison which is preferred when the scanning rate is low and the scan receiver 28 samples a plurality, preferably 24, of bits in one measurement, the scan controller 40 waits a predetermined amount of time after receiving sampled data 44 from the scan receiver 28 to verify that all bits required from the voice transceiver 26 have been received in sampled data message 46. Note that the scan controller 40 may proceed with evaluation without further delay if it determines that it has received bit values for each bit corresponding to the bits contained in the sampled data message 44. If the voice transceiver 26 was not able to correctly determine all of the bits corresponding to these contained in the sampled data message 44, a bit comparison can still be made using the bits that were determined by the voice transceiver 26. The scan controller 40 may compare each bit from the sampled data message 44 for which the voice transceiver 26 correctly determined a bit value with the bit value as received in the sampled data message 46. The number of errors will be counted. A bit error rate may be calculated by dividing the number of errors by the number of bits from the sampled data message 44 whose values were correctly determined by the voice transceiver 26 and were received by the scan controller 40 in sampled data messages 42. If the bit error rate is less than or equal to a bit error rate threshold, preferably 8.33%, the signal quality measurement will be considered to be a valid measurement that may be used to make a subsequent handoff determination.

In an alternate method of bit comparison which is preferred when the scanning rate is high and the scan receiver 28 samples a second plurality, prefereably 8, of bits in one measurement, the scan controller 40 saves a history of bits received both in sampled data message 44 and sampled data message 46. In order to make a bit comparison, the scan controller 40 chooses the most recent bits received in sampled data messages 44 from the scan receiver 28 for which the voice transceiver 26 correctly determined a bit value with the bit value as received in the sampled data message 46. Each of the 24 bits, such as three groups of 8 bit measurements, received in sampled data message 44 from the scan receiver 28 may be compared to the associated bits received from the voice transceiver 26 and received in sampled data message 46. The number of errors in the 24 received bits will be counted. If there are 2 errors or fewer, the measurements from scan receiver 28 will be considered to be valid and may be used to make a subsequent handoff determination.

In the case of an intercell hand-off, the voice transceiver 26 is located in a serving BTS 24, the scan controller 40 is in the MSC 22, and a scan receiver 28 performing the above described operations is located in each BTS 24 that is considered a hand-off target candidate, typically each BTS 24 that is adjacent to the serving BTS 24. In the case of intracell handoff, the voice transceiver 26 is located in a serving BTS 24 and the scan controller may be contained within the voice transceiver 26. In this case, the scan receiver 28 may be located in the serving BTS 24 and may be coupled to each antenna that corresponds to a handoff target candidate.

Figure 4:
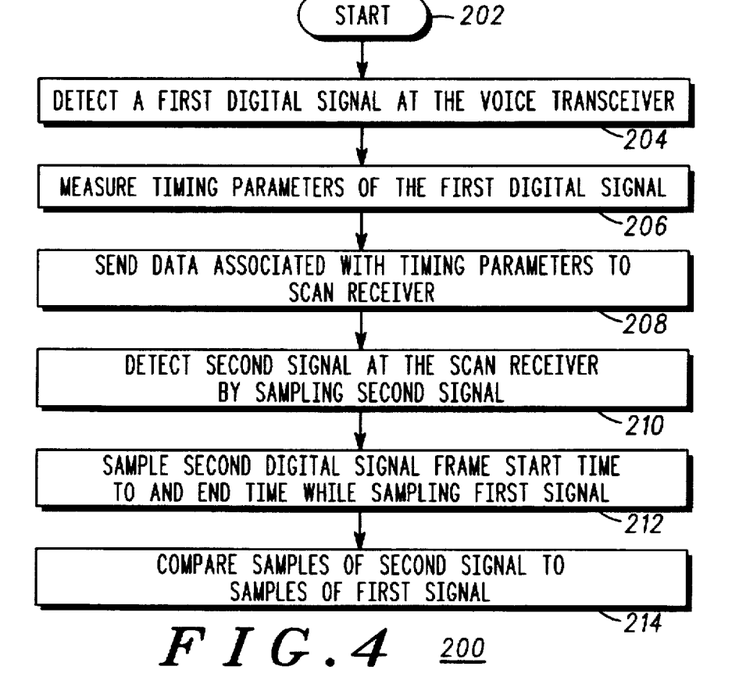
FIG. 4 is a flow chart of a method of processing signals in the system of FIG. 3.

A first embodiment of a method of processing a received signal in a wireless communication system is illustrated in FIG. 4. First, at step 204, a first digital signal is detected at a first receiver, such as the voice transceiver 26. Timing parameters of the first digital signal are measured, at step 206. Data associated with the timing parameters are sent to a second receiver, such as the scan receiver 28, at step 208. A second digital signal is detected and sampled at the second receiver, step 210. The second signal is sampled from a start time to an end time while the first signal is substantially synchronously sampled at the first receiver, step 212. Finally, samples of the second signal are compared to samples of the first signal, at step 214.

Figure 5:
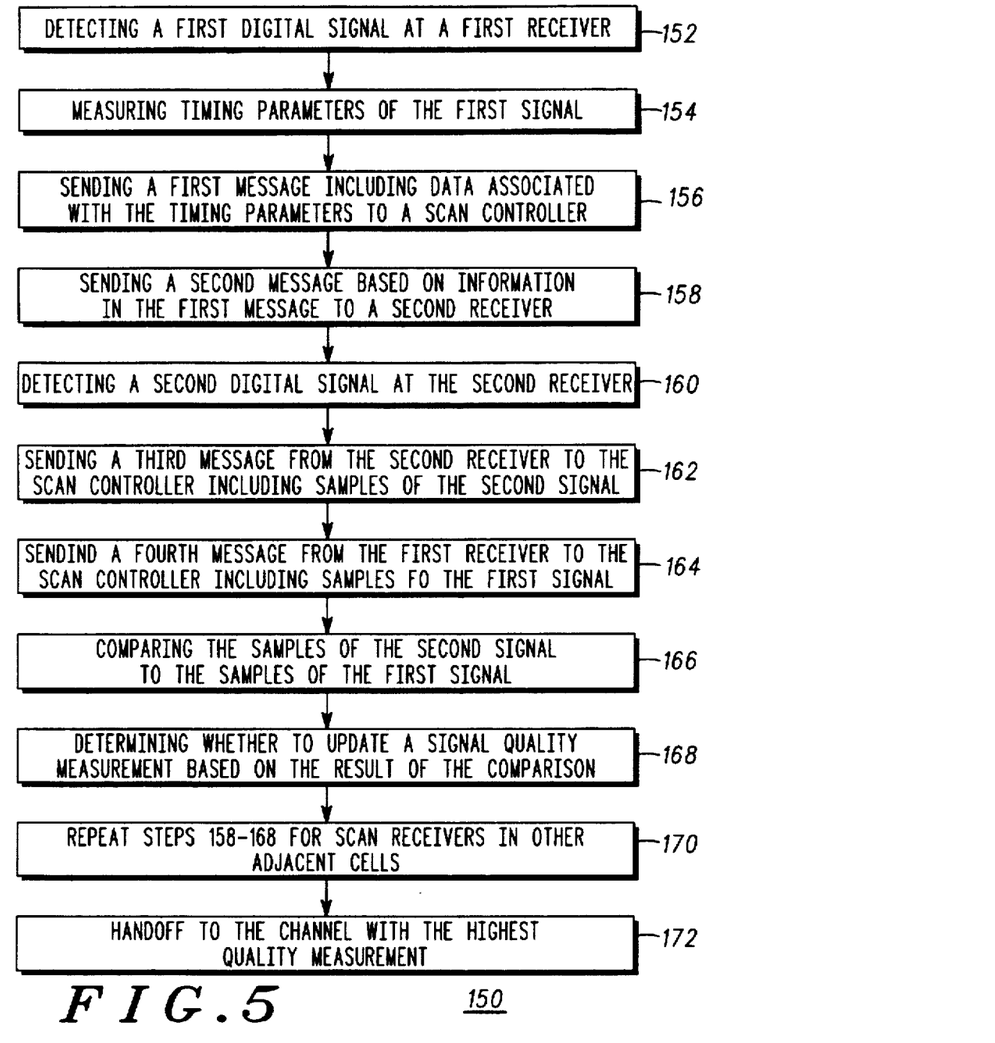
FIG. 5 is a flow chart of a method of performing hand-off in the wireless communication system of FIG. 1.

Referring to FIG. 5, an embodiment of a method 150 of performing hand-off from a first communication channel to a second communication channel is illustrated. A first digital signal is detected at a first receiver, at step 152, and timing parameters of the first signal are measured, at 154. A first message, such as a hand-off request message, containing the measured timing parameters is sent to a scan controller, at step 156, and a second message, such as a hand-off measurement request message, containing timing information based on the first message is sent to a second receiver, at step 158. A second digital signal is detected and sampled at the second receiver, at step 160, and the resulting samples are sent back to the scan controller via a third message, at step 162. The scan controller receives a fourth message containing samples of the first digital signal from the first receiver, at step 164, and then compares the samples from the second receiver to the samples from the first receiver, at step 166. Based on the comparison, a signal quality measurement taken at the second receiver is either validated or invalidated, at step 168. The above steps 158–168 are performed for a scan receiver 28 at each base station, including the same base station in the case of intracell handoff, that is considered a candidate for hand-off. In addition, the scan receiver 28 may perform the above processing steps for one of more antennas. Finally, at step 172, the validated signal quality measurements for each scan receiver are then compared and the base station associated with the highest signal quality is selected. Note that any signal quality measurement from a scan receiver 28 that has been invalidated may not be selected for hand-off.

Figure 6:
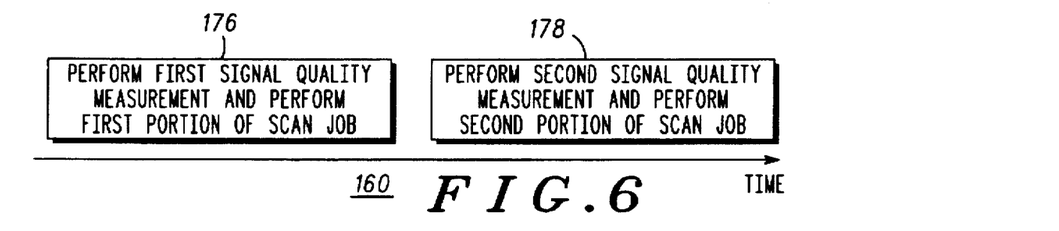
FIG. 6 is a diagram that illustrates timing of operations performed within the scan receiver of FIG. 3.

Referring to FIG. 6, a more detailed method of performing a signal quality measurement and sampling the second digital signal at step 160 of FIG. 5, is illustrated. Since in many scan receiver applications, a signal quality measurement may be performed more quickly than the time required to sample the second signal, it may be desirable to segment the sampling process. For example, a first signal quality measurement may be taken while a first portion of a scanning job is being conducted 176. A first portion of a scanning job typically involves sampling the second detected signal for a number of bits less than the full number requested by the scan controller 40. For example, where a 24 bit scan job is requested, a first portion of the scan job may include 12 bits. Similarly, a second signal quality measurement may be performed while a second portion of the scan job is done, at 178. Although only two portions have been described, it is contemplated that a scan job may be segmented into a plurality of portions, preferably three 8 bit portions, where each portion of the scan job is performed while a different signal quality measurement is taken. Such a method allows the scan receiver to more efficiently perform signal quality measurements and scanning jobs.

An advantage of the above described apparatus is that the bit error rate of a signal received at a receiver, such as a scan receiver, can be determined even if the bit sequence received at that receiver is unpredictable. As long as the bit sequence can be determined correctly by the system, the bit error rate can be calculated. Another advantage of the apparatus and method is that the probability of a handoff being executed due to a false reading is reduced because the scanned bit sequence is compared to a single error corrected bit pattern rather than to 24 possible bit patters.

In a time division multiple access (TDMA) system a data frame typically contains a known synchronization word which can be compared to a received bit sequence to determine a bit error rate. By using the above described apparatus and method it is possible to more accurately calculate the bit error rate of a data frame received by a receiver which could not correctly recover the transmitted data.

Data frames in a code division multiple access (CDMA) system typically do not contain a synchronization word which could be used to detect a bit error rate. The error rate at a receiver in a CDMA system is typically expressed as a frame error rate. By using the above described apparatus and method it is possible to calculate the bit error rate of a received data frame which was received by a receiver which could not correctly recover the transmitted data. The bit error rate calculated by this method would give a better indication of the quality of the received signal than the frame error rate now used in CDMA systems.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of processing a received signal in a wireless communication system, the method comprising the steps of:

detecting a first digital signal at a first receiver;

measuring timing parameters of the first digital signal;

sending data associated with the timing parameters to a second receiver;

detecting a second digital signal at the second receiver while continuing to detect the first digital signal at the first receiver; and comparing the second digital signal to at least a portion of the first digital signal.

2. A method of processing for use with a wireless communication system, the method comprising the steps of:

detecting a first digital signal at a first receiver, the first digital signal representative of information transmitted by a subscriber unit;

sampling a second signal at a second receiver from a start time to an end time to produce a second digital signal; and comparing the second digital signal to a portion of the first digital signal based on the start time and the end time.

3. The method of claim 2, further comprising making a hand-off determination based on the comparison.

4. The method of claim 2, wherein the first digital signal comprises an error corrected digital signal.

5. The method of claim 1, wherein the timing parameter is selected from the group consisting essentially of a bit number, a received bit time, and a bit transmission rate.

6. The method of claim 1, wherein the first digital signal comprises a subaudible signal.

7. A method of performing hand-off from a first communication channel to a second communication channel in a wireless communication system, the method comprising the steps of:

detecting a first digital signal at a first receiver;

measuring timing parameters of the first digital signal;

sending a first message to a central processor responsive to the first and second communication channels, the first message including data associated with the timing parameters;

sending a second message from the central processor to the second receiver, the second message based on information contained in the first message;

detecting a second digital signal at the second receiver beginning at a start time while continuing to detect the first digital signal at the first receiver;

sending a third message from the second receiver to the central processor, the third message including the second digital signal and the start time; and comparing the second digital signal to at least a portion of the first digital signal based on the start time.

8. The method of claim 7, further comprising sending a fourth message from the first receiver to the central processor, the fourth message including data from the first digital signal detected after the start time.

9. The method of claim 7, further comprising determining whether to take a quality measurement of the second digital signal based on the comparison.

10. The method of claim 7, further comprising sending a fourth message from the central processor to a third receiver, the fourth message based on information contained in the first message;

detecting a third digital signal at the third receiver beginning at a second start time while continuing to detect the first digital signal at the first receiver;

sending a fifth message from the third receiver to the central processor, the fifth message including the third digital signal and the second start time; and comparing the third digital signal to at least a portion of the first digital signal based on the second start time.

11. A wireless communication system comprising:

a first antenna receiving a first analog signal;

a second antenna receiving a second analog signal;

a first receiver responsive to the first antenna, the first receiver detecting a first digital signal derived from the first analog signal;

a second receiver responsive to the second antenna and time synchronized with the first receiver, the second receiver detecting a second digital signal derived from the second analog signal;

a measurement unit responsive to the first receiver, the measurement unit measuring timing parameters of the first digital signal; and a data communication link responsive to the first receiver, the data communication link carrying data associated with the timing parameters.

12. The system of claim 11, wherein the second receiver is responsive to the data associated with the timing parameters carried by the data communication link.

13. The system of claim 11, wherein the first receiver is in communication with a scan controller via the data communication link, the scan controller receiving the data associated with the timing parameters and receiving samples of the first digital signal taken by the first receiver and samples of the second digital signal taken by the second receiver.

14. The system of claim 11, wherein the measurement unit comprises a counter.

15. The system of claim 11, wherein the first antenna covers at least a portion of a first cell of a cellular communication system and the second antenna covers at least a portion of a second cell of the cellular communication system.

16. A method of processing for use with a wireless communication system, the method comprising the steps of:

detecting a first digital signal at a first receiver, the first digital signal representative of information transmitted by a subscriber unit;

sampling a second signal at a second receiver over a first time interval from a first start time to a first end time to produce a first portion of a second digital signal;

sampling a second signal at the second receiver over a second time interval from a second start time to a second end time to produce a second portion of the second digital signal; and comparing the first and second portions of the second digital signal to a portion of the first digital signal based on the first and second start times and based on the first and second end times.

17. The method of claim 16, further comprising the step of performing a first signal quality measurement of the second signal at the second receiver during the first time interval and performing a second signal quality measurement of the second signal during the second time interval.

* * * * *